United States Patent [19]
Luxford

[11] Patent Number: 5,577,466
[45] Date of Patent: Nov. 26, 1996

[54] MODULAR PLAY STRUCTURE FOR ANIMALS

[76] Inventor: Pamela M. Luxford, 3304 W. Aksarben Ave., Littleton, Colo. 80123

[21] Appl. No.: 301,843

[22] Filed: Sep. 7, 1994

[51] Int. Cl.$^6$ .......................... A01K 29/00; A01K 1/035
[52] U.S. Cl. ........................................ 119/706; 119/485
[58] Field of Search .................... 119/706, 702, 119/28.5, 15, 482, 485

[56] References Cited

U.S. PATENT DOCUMENTS

| | | |
|---|---|---|
| D. 224,686 | 8/1972 | Michlap et al. . |
| 1,145,205 | 7/1915 | Mills, Jr. . |
| 1,620,574 | 3/1927 | Savage . |
| 2,482,402 | 9/1949 | Corcodilos . |
| 3,450,405 | 6/1969 | Mates . |
| 3,479,990 | 11/1969 | Crow . |
| 3,479,991 | 11/1969 | Lichtenberger . |
| 3,482,548 | 12/1969 | Burns . |
| 3,595,209 | 7/1971 | Parker . |
| 3,690,610 | 9/1972 | Pierce . |
| 3,853,074 | 12/1974 | Madey . |
| 3,859,961 | 1/1975 | Willinger et al. ......................... 119/15 |
| 4,177,763 | 12/1979 | Cook . |
| 4,497,279 | 2/1985 | Bell . |
| 4,577,590 | 3/1986 | Skroch . |
| 4,790,265 | 12/1988 | Manson . |
| 4,971,593 | 11/1990 | Mayhall et al. . |
| 4,996,946 | 3/1991 | Olson . |
| 5,067,440 | 11/1991 | Hatten et al. . |
| 5,387,165 | 2/1995 | Warren ................................ 119/702 X |

*Primary Examiner*—Robert P. Swiatek
*Assistant Examiner*—Elizabeth Shaw
*Attorney, Agent, or Firm*—Lee R. Osman

[57] ABSTRACT

A modular play structure for animals positionable upon a support surface, comprising a base engageable with the support surface, a plurality of elongated spacer members, with each member having opposing ends. The plurality of spacer members are releasably attached end to end to adjacent spacer members in a linear configuration to form an elongated pole having two opposite ends. The interconnection of the adjacent ends spacer members forms a threaded connector assembly. One end of the pole is releasably attached to the base to support the pole in a vertical orientation relative to the base and the support structure. The pole and base together form a base unit. A structural piece is attachable between two spacer members to act as a platform to support a cat. The base units can be interconnected by structural pieces.

6 Claims, 5 Drawing Sheets

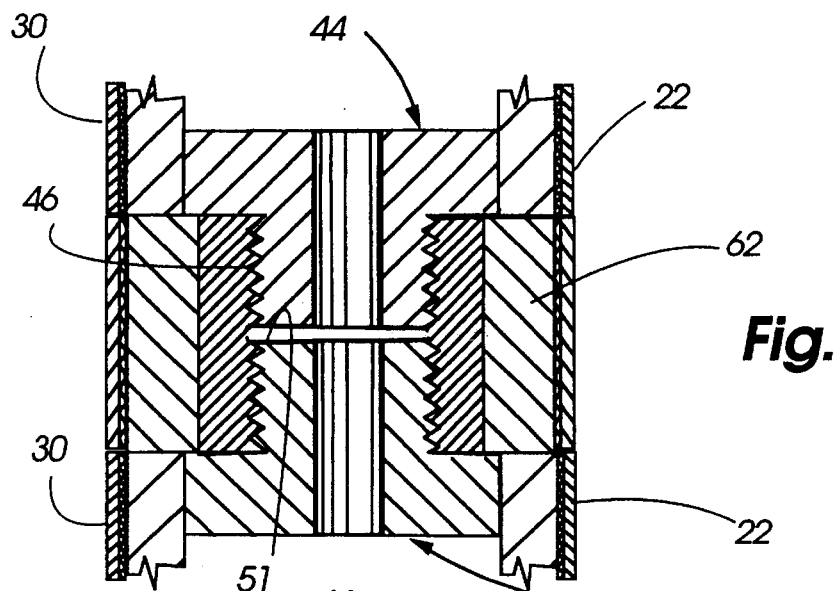
Fig. 12
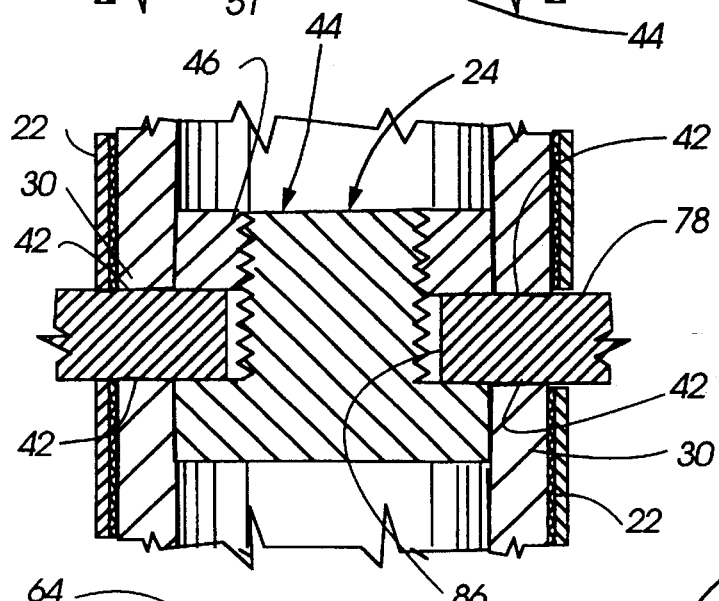
Fig. 9
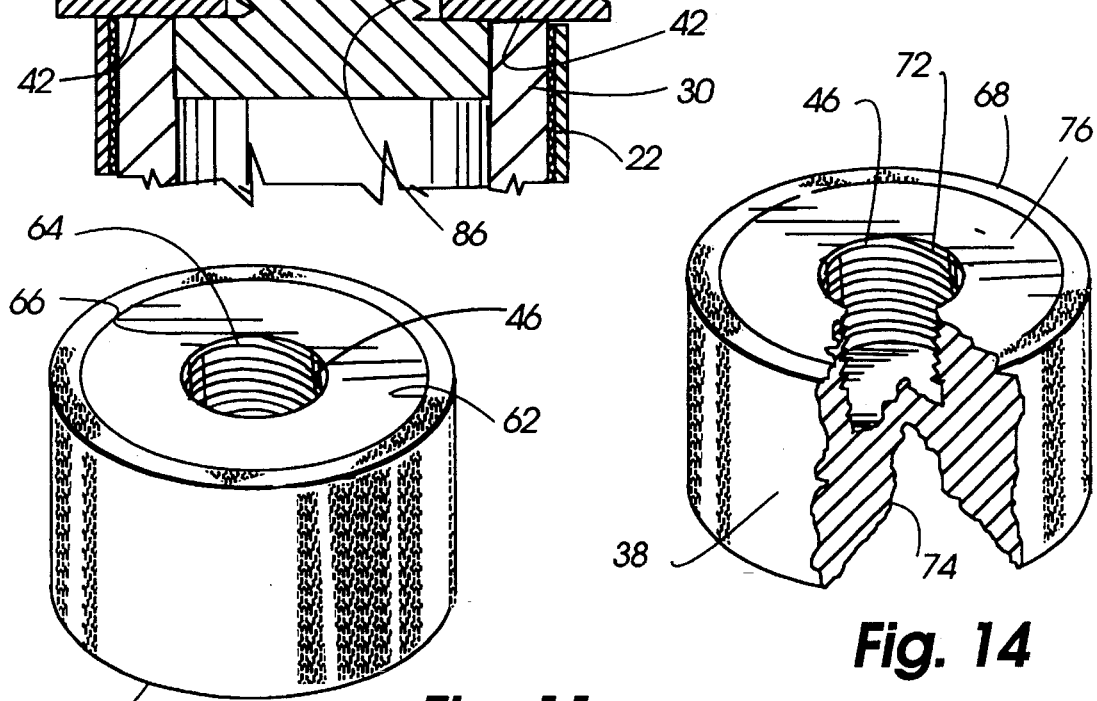
Fig. 11
Fig. 14

MODULAR PLAY STRUCTURE FOR ANIMALS

BACKGROUND OF THE INVENTION

1. Field of the Invention

The present invention concerns a play structure for animals, and more particularly concerns a play structure for cats that is modular and allows a user to easily modify the configuration of the structure.

2. Description or the Prior Art

It is well known that cats enjoy perching on tall objects, are curious about investigating enclosed spaces, and have a habit of scratching objects to exercise and sharpen their claws. To this end, several products have been developed that facilitate these unique characteristics of cats.

U.S. Pat. No. 3,595,209, issued to Parker, describes an exercise pole assembly for cats. The pole extends between the floor and ceiling of a room, and consists of a plurality of sections held in vertical orientation by dowels. The dowels are removable to allow the posts to be easily disassembled to move the assembly. The dowels fit through optional platforms to secure the platforms between the sections. The pole is held in place by a spring bias force exerted between the top section and the top platform while the top platform is in engagement with the ceiling. The sections are made of soft wood to allow a cat to easily climb the structure to reach the various platforms.

U.S. Pat. No. 4,497,279, issued to Bell, describes an animal play structure comprising four parallel posts. The posts have apertures therein to receive rods, which connect the posts together. The rods also act as supports for the platforms. Ramps are connected to rods at different levels to allow the animal to move from a platform at one level to a platform at a different level. Each pole is made of a plurality of sections, and are vertically aligned by dowels. The structure can be easily assembled and disassembled, and the beds and ramps can be rearranged to vary the path or maze of the play structure.

U.S. Pat. No. 3,479,991, issued to Lichtenberger, describes an animal climbing structure consisting of a plurality of tubular sections oriented vertically on top of one another. The structure is placed between two surfaces, such as a floor and a ceiling, and is removably fixed in that position by a threadedly extendable and retractable plate located at the bottom of the structure. The sections are held together by plugs, one end of which is fixed inside one of the sections, and the other end of which forms a male connector for insertion into the corresponding section. Platforms are mounted on the structure between the sections by placing the male portion of the plug through an aperture in the platform to secure the platform in its position. The exterior of each section and platform is covered by a suitable traction surface, such as carpet, to allow the animal to scratch and climb.

U.S. Pat. No. 3,479,990, issued to Crow, describes a cat tree consisting of a tubular structure extending between a floor and a ceiling. The tube consists of a plurality of sections, in this case three, with the middle tube section having crimped ends. The crimped ends fit into the tubular ends of the top tube section and the bottom tube section to releasably secure the three tubes together in a vertical orientation. The bottom tube section is attached to a platform, which sits on the floor and acts as a base. A plunger is located in the top tube section, and is longitudinally extendable therefrom. The plunger extends to engage the ceiling, and is fixed at any desired extended position by a set screw. The plunger pushes against the ceiling, while the base engages the floor, thus keeping the structure in place. Platforms are located in fixed positions along the structure.

U.S. design Patent No. Des. 224,686, issued to Michlap, shows a pet house consisting of a relatively large diameter short, hollow cylinder supporting a smaller diameter long, hollow cylinder, the interiors of which are interconnected. A platform is mounted on top of the longer cylinder. The structure is elevated above a support surface by a plurality of legs. A number of apertures are formed in various walls of the cylinders to allow a cat to play inside and around the structure.

U.S. Pat. No. 4,790,265, issued to Manson, describes a cat scratching pole and exercise structure consisting of two posts fixedly mounted on a base and spaced apart from one another. The two posts are connected by a rod to allow the cat to walk between the posts, among other things. The posts and base are covered by a pile material adequate for cat scratching.

The products currently available for use as play structures for cats have several limitations that effect their utility and function. Several products require a floor and ceiling to be relatively close together in order for the structure to be adequately supported. Other products take up an inordinate amount of space when constructed. Further, many products available for use as play structures for cats have a substantially fixed configuration and are not meant to be modified once installed. If the structures are able to be modified, then only a few minor parts are repositionable within the framework of the existing structure.

Many of the structures are difficult to store, assemble and disassemble, even though they have a fairly simple structure. Also, typically the structures are covered with carpet-like material, which is not sufficiently resistant to the clawing action of a cat.

It is with respect to these considerations and other background information relative to prior art play structures for cats that the significant improvements of the present invention have evolved.

SUMMARY OF THE INVENTION

The present invention in general terms concerns a modular play structure for cats. The structure of the present invention overcomes many of the aforementioned limitations and problems. The play structure is easily constructed, modified, and taken down.

The structure rests upon a support surface and includes a base, an elongated spacer member having opposite ends where one end is releasably attached to the base member to form a base unit and any of a plurality of structural pieces that are removably attachable to the other end of the spacer member. The base units are able to be releasably connected together by structural pieces.

A plurality of spacer members can be releasably attached end to end to adjacent spacer members in a linear configuration to form an elongated pole, one end of which is releasably attached to the base member to support the pole in a vertical orientation relative to the base member. The pole, when connected to the base member, also forms a base unit; a plurality of base units are releasably connectable using a structural piece.

A threaded connector assembly is utilized to connect adjacent ends of the spacer members. The threaded connector assembly comprises a threaded female receptacle fixedly attached to one end of a spacer member, and a threaded male extension fixedly attached to one end of the adjacent connected spacer member, where the threaded male extension is threadedly receivable in the threaded female receptacle in order to connect the spacer members together.

Typically, one end of a spacer member includes a male connector while the other end of the same spacer member includes a female connector to facilitate connecting the spacer member to similarly configured spacer members. However, where two spacer members are to be connected together and both spacer members have the same type of connector, e.g. two female connectors or two male connectors, a converter can be used to facilitate the connection.

Structural pieces are releasably connectable to the base unit to add variety to the configurations available for the play structure. Each structural piece acts basically as a support platform on which an animal can rest. The structural pieces typically connect to the base unit by attaching between the spacer members to become part of the threaded connection assembly. Other structural pieces replace spacer members in the modular play structure. The structural pieces can be used to interconnect separate base units in any of a number of configurations.

All of the components of the modular play structure of the present invention are covered with a material highly resistant to the clawing actions of a cat. The material is preferably similar to that used as the loop portion of a Velcro® fastener.

Accordingly, it is a primary object of the present invention to provide a play structure for animals that is modular.

It is another object of the present invention to provide a play structure for animals that is configurable in any of a variety of structural shapes.

It is yet another object of the present invention to provide a play structure for animals that is light weight and easy to breakdown for storage.

Still a further object of the present invention is to provide a play structure for animals that includes a covering material that is extremely resistant to the clawing actions of a cat.

Other aspects, features, and details of the present invention can be more completely understood by reference to the following detailed description of a preferred embodiment, in conjunction with the drawings, and from the appended claims.

BRIEF DESCRIPTION OF THE DRAWINGS

FIG. 9 is an enlarged section taken substantially along the plane of line 9—9 of FIG. 1.

FIG. 11 is an isometric view of a male-to-female converter as shown in FIG. 1.

FIG. 12 is an enlarged section taken substantially along the plane of line 12—12 of FIG. 1.

FIG. 14 is an isometric, cut-away view of another embodiment of the cap end.

DESCRIPTION OF THE PREFERRED EMBODIMENT

Figure 1:
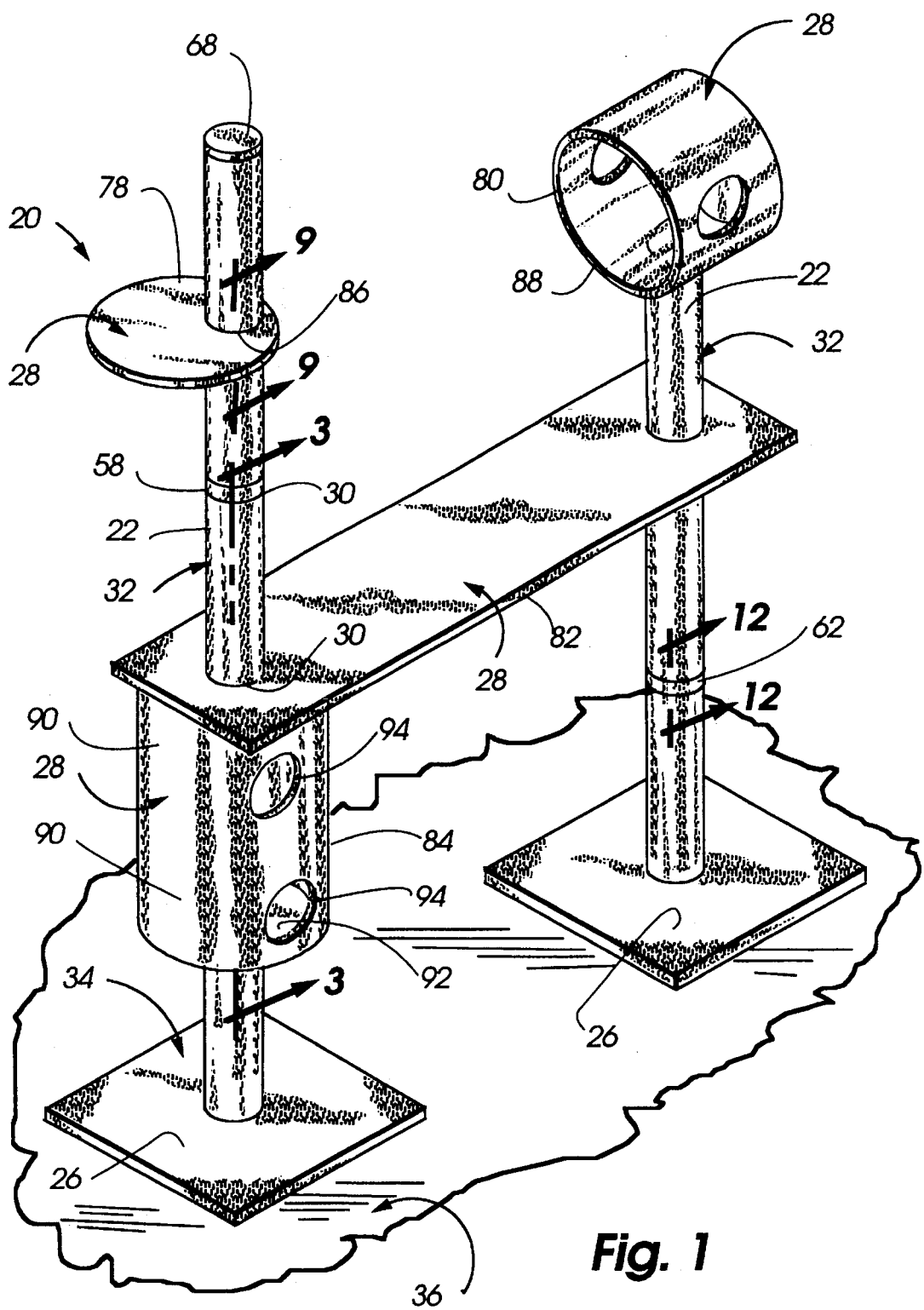
FIG. 1 is an isometric view of a play structure for animals in accordance with the present invention, illustrating a plurality of spacer members, a base, a plurality of structural pieces, a plurality of converters, and a cap end.

Referring first to FIG. 1, the play structure 20 of the present invention can be seen to comprise a plurality of interconnected modular components including spacer members 22 having threaded connector assemblies 24, a base member 26, and a variety of structural pieces 28. The elongated spacer members are cylindrical in shape, each having opposite ends 30 defining a perimeter 31 and having a diameter 33. The spacer members are connected end to end in a linear fashion, forming an elongated pole 32. The ends 30 of the spacer members form threaded connector assemblies 24 adapted to releasably attach adjacent spacer members together. An outermost end of the elongated pole is releasably and rigidly attached to a base member 26, forming a base unit 34. The base member rests on a support surface 36 and supports the linearly connected spacer members in a vertical orientation relative to the base member and support surface. The base member supports the structure in its entirety, eliminating the need to support the structure by other means. While many types of animals may enjoy using the present invention, it is primarily for use by domesticated cats and their owners.

A large variety of structural pieces 28 can be removably inserted between the spacer members 22 to construct a play structure 20 in accordance with the desires of the user. The structural pieces, while embodying any variety of configurations, all basically serve as a platform for supporting the cat. Some structural pieces establish a replacement for spacer members. Other structural pieces simply fit between adjacent spacer members and are thus interposed in the threaded connector assembly 24 between adjacent spacer members.

Figure 2:
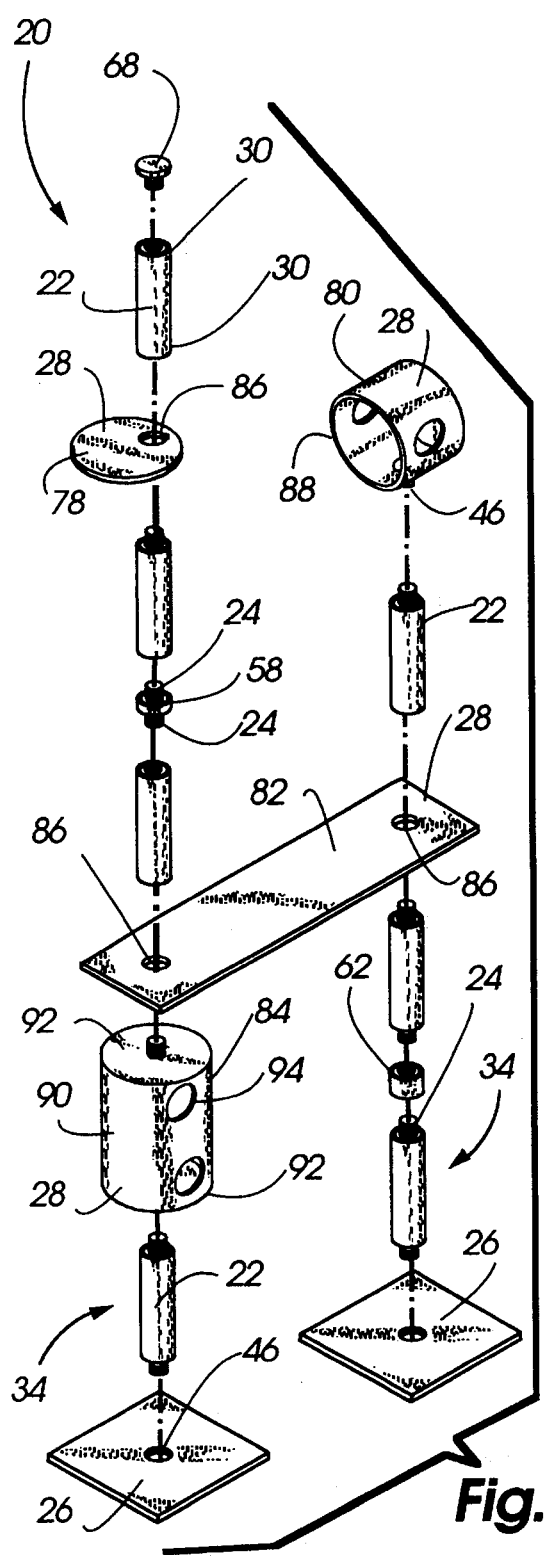
FIG. 2 is an exploded isometric view of the components of the play structure shown in FIG. 1.

In its most basic form, the present invention is a modular play structure 20 with a multiplicity of configurations which are able to be modified quickly and easily using the threaded connector assemblies 24, as shown in FIG. 2. The modular nature of the play structure 20 allows several of the base units 34 to be interconnected together by any of a number of structural pieces 28 modified for that purpose, thus forming an entirely custom configured network of structures on which a cat can play, rest or even use as a scratching post.

As shown in FIGS. 3, 4, 5 and 6, the base member 26, spacer members 22, and structural pieces 28 are all covered in a durable material 38 such as the loop material used in Velcro®, which is exceptionally resistant to the clawing action of a cat. The material provides a comfortable covering for a cat to rest upon, and also provides a tough, resilient, scratch-resistant material for the cat to use for clawing.

Referring to FIGS. 2, 3, 7 and 8, the elongated spacer members 22 preferably have a tubular shape with a circular cross section. Each spacer member has laterally opposite open ends 30. The perimeter 40 of the open ends forms a shoulder 42 for use in securing a structural piece 28 between spacer members 22, as is further described herein. The circular cross section allows the user to attach the spacer members 22 end to end without regard to the rotational orientation of each individual member. The spacer members each have an overall hollow cylindrical shape, and are made of plastic or similar material for convenient manufacturing and light weight. The outer surface of the spacer member, as noted above, is preferably covered in a loop material 38 similar to the loop material of the Velcro® product. The spacer members 22 are typically of the same length, however, different length spacer members (not shown) are contemplated to allow the user to adjust the height of the structure. When connected together, the spacer members form the elongated pole 32.

The threaded connector assembly 24, as shown in FIGS. 3, 4, 5 and 6, which comprises threaded male 44 and female 46 connectors at the ends of connected spacer members 22, allow the spacer members to be securely attached together, while also enabling the user to easily disconnect the spacer members from one another. There are several different structural embodiments of the threaded connector assembly 24, all allowing the spacer members to be connected together in a similar manner.

The first embodiment of the threaded connector assembly 24 consists of a threaded male connector 44 extending axially from an end 30 of one spacer member 22 and a matching threaded female connector 46 positioned in an end 30 of an adjacent spacer member 22, as shown in FIG. 9. The threaded male connector 46 is threadably receivable in the threaded female connector 46 to releasably connect the two axially aligned spacer members 22 together.

Figure 7:
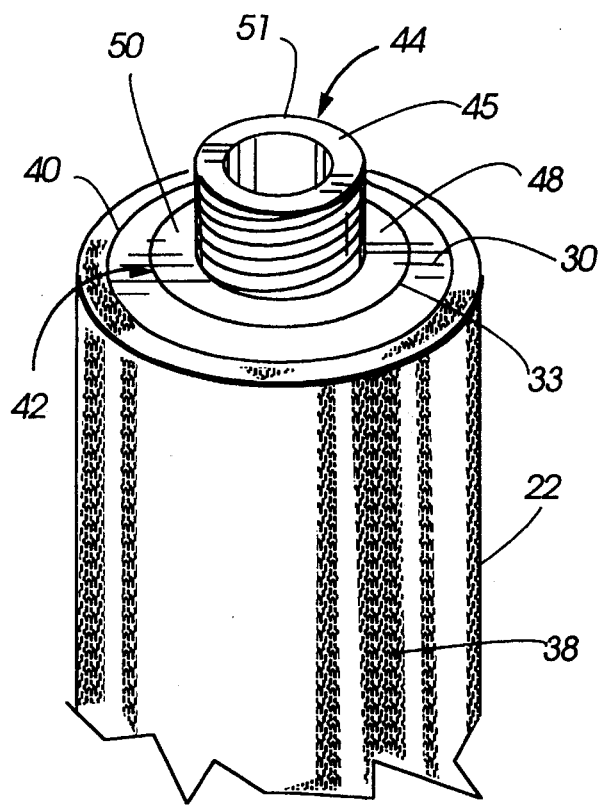
FIG. 7 is an isometric view of a threaded male connector attached to an end of the spacer member.
Figure 8:
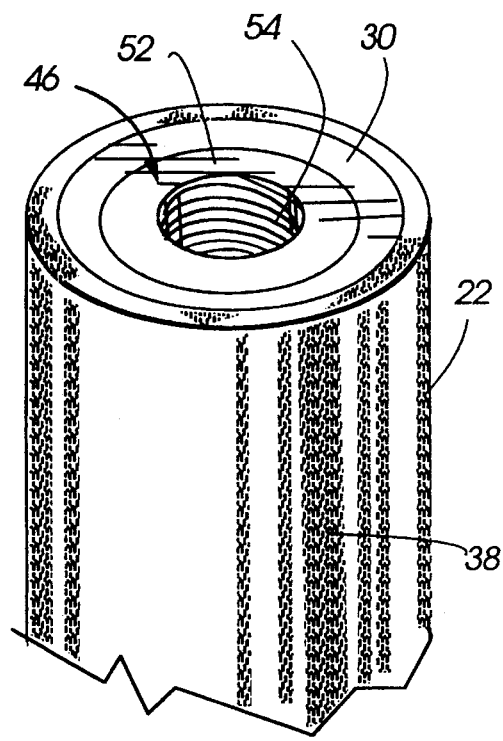
FIG. 8 is an isometric view of a threaded female connector attached to an end of the spacer member.

Referring to FIG. 7, a proximal end 48 of the threaded male connector 44 defines an annular flange 50 which is fixably positioned, as though a press fit or with adhesive, within one of the open ends 30 of the spacer member 22 such that only a threaded portion 51 of the male connector 44 extends beyond the end of the spacer member 22, as shown in FIG. 7. The threaded portion 51 is cylindrical in shape and defines a perimeter The threaded female connector 46, as shown in FIG. 8, comprises a circular collar 52 having a threaded axial recess 54 defining an interior cylindrical wall 56 for threadably receiving the threaded portion 51 of the adjacent male connector 44. As an alternative arrangement, the interior cylindrical wall 56 of the spacer member 22 can have threads formed therein adequate to receive the threaded male portion 51 of the male connector 44. The perimeter 40 of the spacer member at a female connector 46 defines the shoulder 42.

In this type of embodiment, the spacer members 22 have one end 31 defining a threaded male connector 44 and an opposing end defining a threaded female connector 46 enabling adjacent spacer members 22 to be connected in a linear orientation. It is contemplated that each spacer member could have the same type of threaded connector at both ends, with the adjacent spacer members alternating threaded connector types to facilitate construction.

Figure 6:
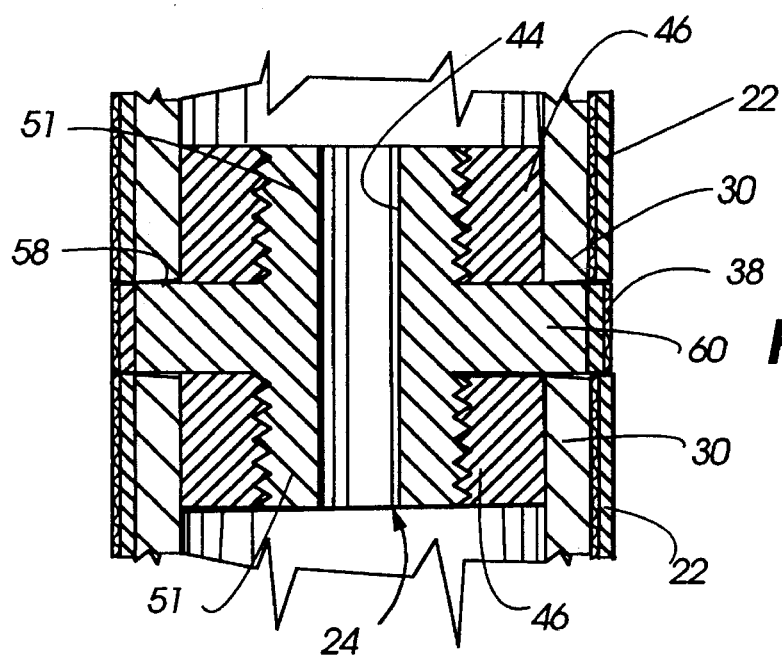
FIG. 6 is an enlarged section taken substantially along the plane of line 6—6 of FIG. 3.
Figure 5:
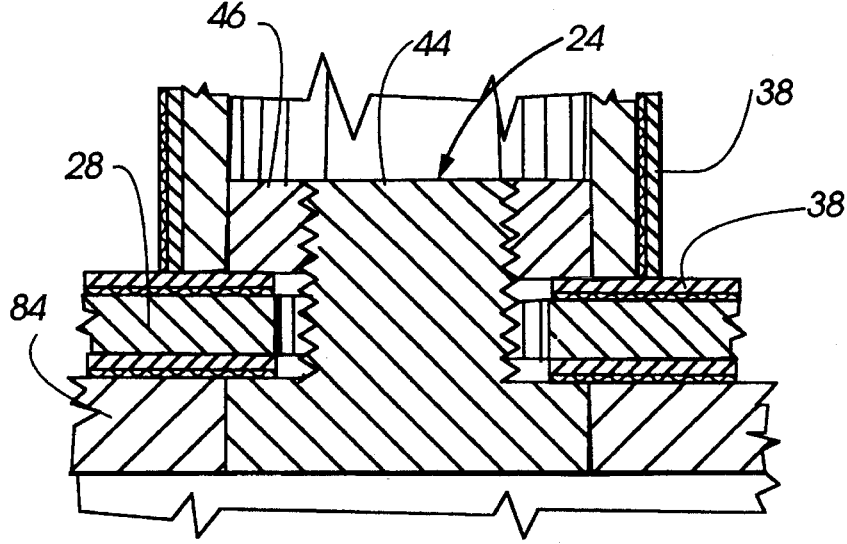
FIG. 5 is an enlarged section taken substantially along the plane of line 5—5 of FIG. 3.
Figure 4:
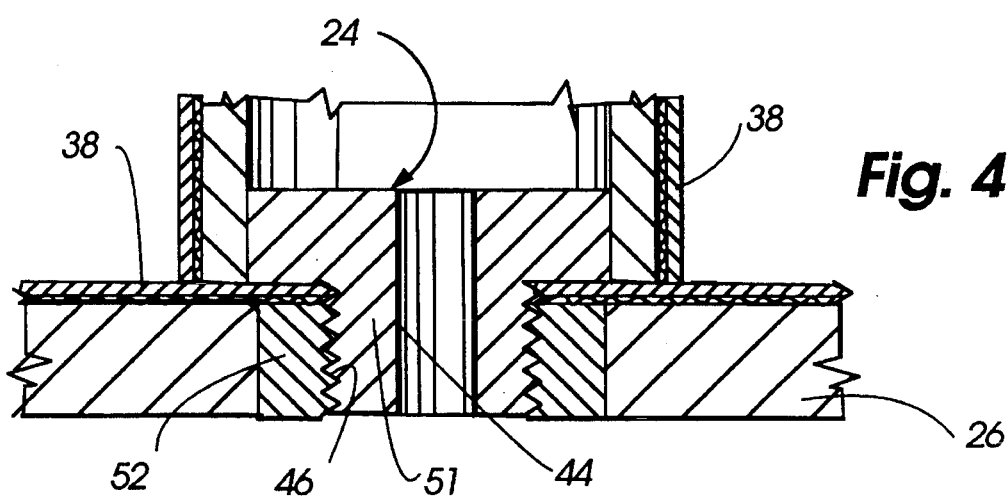
FIG. 4 is an enlarged section taken substantially along the plane of line 4—4 of FIG. 3.
Figure 10:
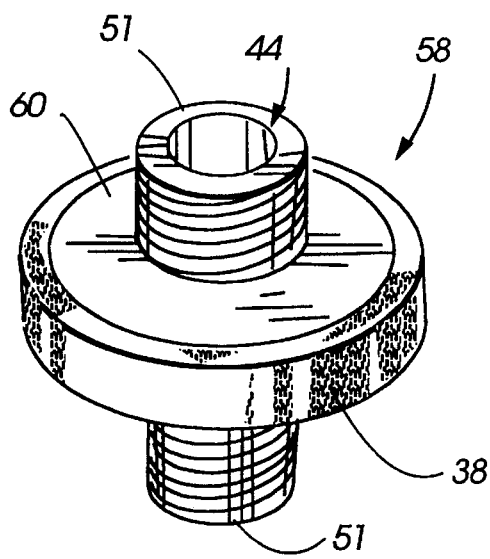
FIG. 10 is an isometric view of a female-to-male converter as shown in FIG. 1.

The second embodiment of the threaded connector assembly 24 comprises spacer members 22 having only threaded female connectors 46 at either end, which are used in conjunction with a female-to-male converter 58, as shown in FIG. 10. The threaded female connector preferably has either of the configurations previously defined. The female-to-male converter 58 comprises opposing threaded portions 51 of the male connector 44 connected by a disc-shaped main body 60, as shown in FIGS. 6 and 10. The female-to-male converter 58 is threadably received in one of the threaded female connectors 46 at an end 30 of one of the spacer members 22, and the unused or free threaded portion 51 of the male connector 44 on the converter is threadably received in the threaded female connector 46 of an axially aligned adjacent spacer member 22 to facilitate connecting the two spacer members to one another. This can be done indefinitely to construct the posts to the length desired by the user.

A third embodiment of the threaded connector assembly 24 comprises spacer members 22 having threaded male connectors 44 at both ends, which are used in conjunction with a male-to-female converter 62, as shown in FIG. 11, to allow the spacer members to be connected together. The male-to-female converter 62 comprises a hollow cylindrical section 64 having opposite ends 66, a circular cross section similar to that of the spacer member 22, and also having a threaded axially opening female connector 46 at either end.

As shown in FIG. 12, the male-to-female converter 62 is first threadably received on the threaded male connector 44 of one of the spacer members 22, and the adjacent spacer member is then threadably received in the male-to-female converter 62, resulting in the two spacer members being releasably attached to one another in an axially aligned relationship.

The base member 26 of the present invention, as shown in FIG. 1, is preferably a solid square or rectangular sheet of plastic or other such material. The base member has adequate dimensions and mass to keep the play structure from tipping over when being used by a cat. The base member 26 could also be sand filled or of some other configuration sufficient for this purpose. The base is covered with the loop material 38 for resistance to the clawing action of cats.

The base member 26 has either a threaded male connector 44 or a threaded female connector 46, depending on the type of threaded connector found on the spacer members 22. The base member is shown with a female connector 46 in FIG. 4. A spacer member 22 is threadably attached to the base member 26 so that the connected spacer members are supported in a vertical manner above the base member 26. When the spacer members are connected to the base member, the combination of the base and the interconnected spacer members form the base unit 34.

The threaded connector assemblies 24, as herein described, offer the user a releasable yet strong connector to connect all the separate components of the present invention together with adequate strength to withstand the forces applied to the structure during use, and also allow the user to easily disassemble or reassemble in a different configuration.

The male-to-female converter 62 and the female-to-male converter 58 can be used whenever necessary to connect two like ends 30 on spacer members 22. As will be further described below, the converters may also be of use when attaching the structural pieces 28 to the base unit 34.

Figure 13:
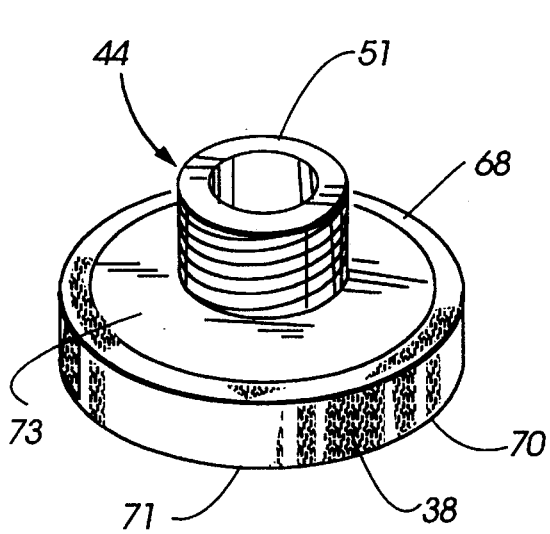
FIG. 13 is an isometric view of the cap end.

A cap end 68, as shown in FIG. 13, is provided to cover the end 30 of a spacer member 22 or attach a structural piece 28, as necessary, to give the play structure 20 a finished look. The cap end 68 has two embodiments, the first comprising a disc-like body 70 defining a perimeter 71 and having a threaded male portion 51 extending therefrom, which forms a shoulder 73 around the perimeter 71. The disc-like body has the same diameter and circular cross section as the spacer member 22. The exposed surface 72 of the disc-like body 70 is covered with the same material 38 as covers the spacer members for aesthetic purposes. A structural piece 28 can be secured between the cap end and the spacer member, similar to how the structural piece is secured between two adjacent connected spacer members, as is described below.

The second embodiment of the cap end 68 comprises a hollow cylinder 72 having one closed end 74 and an opposite open end 76 defining a threaded female connector 46, as shown in FIG. 14. The threaded female connector is threadably engageable with an exposed threaded male connector 44 of a spacer member 22 or structural piece 28, thus providing a finished look. The second embodiment of the cap end 68 can be used to attach a structural piece 28 to a base unit 34, and is also covered with the same material 38 as is found on the spacer members 22.

An unlimited variety of structural pieces 28 can be used in conjunction with the base unit 34 to build a play structure 20 appealing to both the user and the cat. In general, they are platforms for supporting the cat upon the structure 20. A few examples of structural pieces 28 are provided herein, however it is contemplated that virtually any shape can be used. Referring to FIGS. 1 and 2, four structural pieces 28 are shown, including a cantilever platform 78, a horizontal cylindrical platform S0, a spanning platform 82, and a vertical cylindrical platform 84. Preferably, the structural pieces 28 fit onto the base unit 34 in one of three general ways.

The first way to connect a structural piece 28 to the base unit 34 is utilizable with both the cantilever platform 78 and the spanning platform 82, and is shown in FIGS. 1, 2 and 9. These two platforms have an aperture 86 of a predetermined circumference that is greater than the circumference of a threaded portion 51 of the male connector 44 but smaller than the circumference of a spacer member 22. The aperture 86 thus fits over the threaded male connector 44 of one of the spacer members, and engages shoulder 42. A threaded female connector 44 is then threadably engaged with the threaded male connector 44 and tightened down to pinch the platform 78 between shoulders 42, thus fixing the platform 78 in its position on the base unit 34. The threaded male connector 44 and the threaded female connector 46 have a sufficient length of engagement to allow such platforms 78, 82 to be interposed between the two components of a threaded connector assembly 24.

The cantilever platform 78, as shown in FIG. 2, has a flat, circular shape with the aperture 86 located off-center. Thus, when the cantilever platform is attached to the base unit 34, it acts as a cantilever beam to support the cat.

The horizontal cylindrical platform 80, also seen in FIG. 2, having a hollow cylindrical shape, and at least one open end 88, provides a second way to attach a structural piece 28 to the base unit 34. The horizontal cylindrical platform includes the appropriate threaded connector 44 or 46 attached on the outside of its cylindrical wall to enable the horizontal cylindrical platform to threadably engage an end 30 of a spacer member 22.

Figure 3:
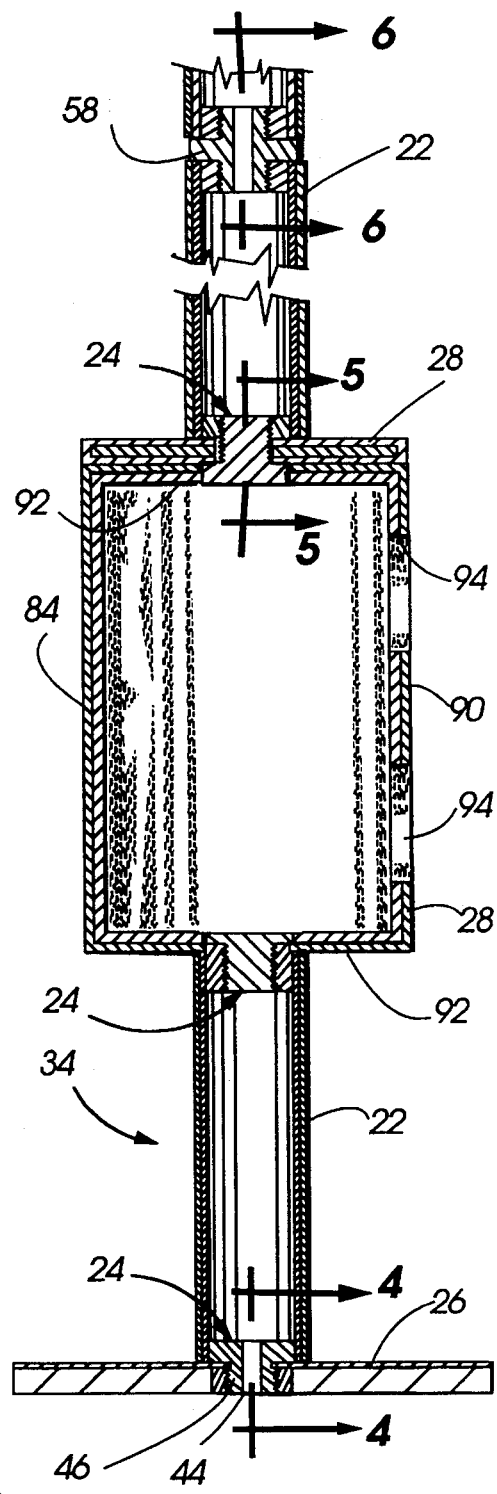
FIG. 3 is an enlarged section taken substantially along the plane of line 3—3 of FIG. 1.

The third way to attach a structural piece 28 to the base unit 34 is achieved through use of the vertical cylindrical platform 84, as shown in FIGS. 1, 2 and 3. The vertical cylindrical platform has a hollow cylindrical main body 90 defining two opposite closed ends 92, and defines a plurality of radially directed apertures 94 of circular configuration through its cylindrical wall. The vertical cylindrical platform 84 replaces the spacer member 22, and includes the appropriate threaded connectors 24 at both of its ends 92 to allow it to fit between adjacent spacer members 22. Any of a multitude of shapes are contemplated for use in this manner.

The fourth type of structural piece is the spanning platform 82, as shown in FIGS. 1 and 2. The spanning platform is a flat, rectangular body having opposite ends 83, which attach to base unit 34 in the same way as the cantilever platform 78, however, it has a dimension sufficient to extend outwardly from the base unit 34 to at least a second base unit to which it attaches in the same manner. Apertures 94, located adjacent to each end 83 of the spanning platform, facilitates the attachment of the platform 82 to more than one base unit 34. The spanning platform allows the user to build a custom interconnected structure with a virtually unlimited number of configurations, thus making the present invention truly modular. All of the structural pieces 28 are covered with the same material 38 as found on the spacer members 20 and base member 26.

It is foreseeable that the structural pieces 28 will have countersunk holes (not shown) to receive the cap end 68 in a flush manner. For instance, if the cantilever platform 78 was positioned at the very top of the base unit 34 in FIG. 1, the cap end would be threadably engaged to the top spacer member 22, and would then fit flush within the countersunk hole.

In use, the owner constructs the play structure 20 by building base units 34 and adding structural pieces 28 thereto. The modular nature of the spacer members 22 and the threaded connector assemblies 24 allow the owner to build many varieties of structural configurations, and even allows the owner to easily modify the structure 20 as it is being built. Once the play structure 20 is built, the owner can add structural pieces 28, spacer members 22, or entire base units 34 as desired to change the shape of the structure.

The play structure 20 can be easily disassembled entirely or in part because of the threaded connector assemblies 24. The owner simply disengages the threaded connectors 44, 46 from one another. The play structure 20 components are compactly sized for easy storage, and are extremely light for carrying convenience.

Although the present invention has been described with a certain degree of particularity, it is understood that changes in detail or structure may be made without departing from the spirit of the invention, as defined in the appended claims.

I claim:

1. A modular play structure for animals, said structure being positionable upon a support surface, and comprising:

a. a base engageable with the support surface;

b. a plurality of elongated spacer members, each spacer member having opposite ends, the plurality of spacer members being releasably attached end to end to adjacent spacer members in a linear configuration and forming an elongated pole having two opposite ends, one end of which is releasably attached to the base to support the pole in a vertical orientation relative to the base, the pole and base together forming at least one base unit;

c. a structural piece removably attached between two spacer members;

d. said adjacent ends of connected spacer members form a threaded connector assembly, said connector assembly comprising:
a threaded female receptacle attached to one end of a connected adjacent spacer member; and
a threaded male extension attached to one end of a connected adjacent spacer member, the threaded male extension threadedly receivable in the threaded female receptacle, e. wherein said structural piece comprises a platform for supporting an animal upon the structure;

f. the threaded male extension having a circumference, the spacer member having a circumference, and the circumference of the threaded male extension being less than the circumference of the spacer member, forming a shoulder, and an opposing shoulder being defined on the female connector of an adjacent connected spacer member;

g. said platform having at least one aperture defining a perimeter with a circumference greater than the circumference of the threaded male extension and less than the circumference of the spacer member to engage the shoulder on the threaded male connector, said opposing shoulder on the threaded female connector engaging the perimeter of at least one aperture of the platform when the male connector and female connector are threaded together to pinch the platform therebetween; and h. wherein said platform has a circular shape, and wherein said at least one aperture is positioned off-center in said platform.

2. A modular play structure for animals, said structure being positionable upon a support surface, and comprising:

a. a base engageable with the support surface;

b. a plurality of elongated spacer members, each spacer member having opposite ends, the plurality of spacer members being releasably attached end to end to adjacent spacer members, wherein the adjacent ends of connected spacer members form a threaded connector assembly, in a linear configuration and forming an elongated pole having two opposite ends, one end of which is releasably attached to the base to support the pole in a vertical orientation relative to the base, the pole and base together forming at least one base unit;

c. a structural piece removably attached between two spacer members;

d. wherein the threaded connector assembly further comprises:
a threaded female receptacle fixedly attached to one end of a connected adjacent spacer member; and
a threaded male extension fixedly attached to one end of a connected adjacent spacer member, the threaded male extension threadedly receivable in the threaded female receptacle; and e. wherein said structural piece comprises
a vertical cylindrical platform having a hollow cylindrical main body defining a cylindrical wall and two opposite closed ends, and a radially directed aperture through the main body cylindrical wall;
a male connector fixedly attached on one of said two opposite ends;
a female connector fixedly attached on the other of said two opposite ends, said connectors for releasably attaching said vertical cylindrical platform between the adjacent spacer members.

3. A modular play structure for animals, said structure being positionable upon a support surface, and comprising:

a. a base engageable with the support surface;

b. a plurality of elongated spacer members, each spacer member having opposite ends, the plurality of spacer members being releasably attached end to end to adjacent spacer members, wherein the adjacent ends of connected spacer members form a threaded connector assembly, in a linear configuration and forming an elongated pole having two opposite ends, one end of which is releasably attached to the base to support the pole in a vertical orientation relative to the base, the pole and base together forming at least one base unit;

c. a structural piece removably attached between two spacer members;

d. wherein the threaded connector assembly further comprises:
a threaded female receptacle fixedly attached to one end of a connected adjacent spacer member; and
a threaded male extension fixedly attached to one end of a connected adjacent spacer member, the threaded male extension threadedly receivable in the threaded female receptacle; and e. wherein said structural piece comprises:
a vertical cylindrical platform having a hollow cylindrical main body defining a cylindrical wall and two opposite closed ends, and a radially directed aperture through the main body cylindrical wall;
a male connector fixedly attached to both of said two opposite ends;
said male connectors for releasably attaching said vertical cylindrical platform between the adjacent spacer members.

4. A modular play structure for animals, said structure being positionable upon a support surface, and comprising:

a. a base engageable with the support surface;

b. a plurality of elongated spacer members, each spacer member having opposite ends, the plurality of spacer members being releasably attached end to end to adjacent spacer members, wherein the adjacent ends of connected spacer members form a threaded connector assembly, in a linear configuration and forming an elongated pole having two opposite ends, one end of which is releasably attached to the base to support the pole in a vertical orientation relative to the base, the pole and base together forming at least one base unit;

c. a structural piece removably attached between two spacer members;

d. wherein the threaded connector assembly further comprises
a threaded female receptacle fixedly attached to one end of a connected adjacent spacer member; and
a threaded male extension fixedly attached to one end of a connected adjacent spacer member, the threaded male extension threadedly receivable in the threaded female receptacle; and e. wherein said structural piece comprises:
a vertical cylindrical platform having a hollow cylindrical main body defining a cylindrical wall and two opposite closed ends, and a radially directed aperture through the main body cylindrical wall;
a female connector fixedly attached to both of said two opposite ends; and
said female connectors for releasably attaching said vertical cylindrical platform between the adjacent spacer members.

5. A modular play structure for animals, said structure being positionable upon a support surface, and comprising:

a. a base engageable with the support surface;.

b. a plurality of elongated spacer members, each spacer member having opposite ends, the plurality of spacer members being releasably attached end to end to adjacent spacer members in a linear configuration and forming an elongated pole having two opposite ends, one end of which is releasably attached to the base to support the pole in a vertical orientation relative to the base, the pole and base together forming at least one base unit;

c. wherein a structural piece is removably attached to an end of a spacer member and comprises:
   a horizontal cylindrical platform having a hollow cylindrical main body defining a cylindrical wall and two opposite ends; and
   a threaded male connector fixedly attached to and radially extending from said cylindrical wall for removable connection to an end of a spacer member.

6. A modular play structure for animals, said structure being positionable upon a support surface, and comprising:

a. a base engageable with the support surface;

b. a plurality of elongated spacer members, each spacer member having opposite ends, the plurality of spacer members being releasably attached end to end to adjacent spacer members in a linear configuration and forming an elongated pole having two opposite ends, one end of which is releasably attached to the base to support the pole in a vertical orientation relative to the base, the pole and base together forming at least one base unit; and c. a structural piece removably attached between two spacer members; and d. wherein said structural piece is removably attached to an end of a structural member, and said structural piece comprises:
   a horizontal cylindrical platform having a hollow cylindrical main body defining a cylindrical wall and two opposite ends;
   a threaded female connector fixedly attached to and radially extending inwardly from said cylindrical wall for removable connection to an end of a spacer member.

* * * * *